United States Patent
Benoliel et al.

(10) Patent No.: US 10,839,411 B2
(45) Date of Patent: Nov. 17, 2020

(54) VALIDATION IN A DECENTRALIZED NETWORK

(71) Applicant: Noodle Technology Inc., San Francisco, CA (US)

(72) Inventors: Micha Anthenor Benoliel, San Francisco, CA (US); Garrett Kinsman, San Francisco, CA (US); Lucien Loiseau, San Francisco, CA (US); Eliott Teissonniere, San Francisco, CA (US)

(73) Assignee: Noodle Technology Inc., San Francisco, CA (US)

(*) Notice: Subject to any disclaimer, the term of this patent is extended or adjusted under 35 U.S.C. 154(b) by 0 days.

(21) Appl. No.: 16/584,426

(22) Filed: Sep. 26, 2019

(65) Prior Publication Data

US 2020/0202376 A1 Jun. 25, 2020

Related U.S. Application Data

(60) Provisional application No. 62/784,080, filed on Dec. 21, 2018.

(51) Int. Cl.
*H04W 24/00* (2009.01)
*G06Q 30/02* (2012.01)
*H04W 4/029* (2018.01)
*H04W 4/38* (2018.01)
*H04W 4/80* (2018.01)

(52) U.S. Cl.
CPC ........ *G06Q 30/0215* (2013.01); *H04W 4/029* (2018.02); *H04W 4/38* (2018.02); *H04W 4/80* (2018.02)

(58) Field of Classification Search
CPC ............ G06Q 20/387; G06Q 30/0226; G06Q 30/0233; G06Q 30/0269; G06Q 20/065; G06F 16/9535; G06F 3/04815; G06F 21/31; H04W 4/30; H04W 12/06; H04W 4/021; H04W 4/029; H04W 12/02; H04W 12/08; H04W 4/14; H04W 88/02; H04W 12/12; H04W 28/0226
See application file for complete search history.

(56) References Cited

U.S. PATENT DOCUMENTS

| 7,814,470 | B2* | 10/2010 | Mamou | G06F 16/254 717/162 |
| 10,417,219 | B1* | 9/2019 | Yang | H04L 9/0643 |
| 2008/0319843 | A1 | 12/2008 | Moser et al. | |

(Continued)

OTHER PUBLICATIONS

International Search Report and Written Opinion PCT/US2019/68438 dated Apr. 1, 2020.

*Primary Examiner* — Khalid W Shaheed
(74) *Attorney, Agent, or Firm* — Maschoff Brennan; Jason W Croft

(57) ABSTRACT

A system may include processing logic configured to execute instructions to cause a system to perform operations including receiving, from an intermediate device, data that originated at an endpoint node. The data may be associated with metadata that was associated with the data by the intermediate device. The operations may also include extracting one or more items from the metadata. The operations may include validating an activity of the intermediate device based on the one or more items that were extracted from the metadata.

17 Claims, 7 Drawing Sheets

(56) References Cited

U.S. PATENT DOCUMENTS

| | | |
|---|---|---|
| 2009/0076896 A1 | 3/2009 | DeWitt et al. |
| 2011/0238517 A1 | 9/2011 | Ramalingam et al. |
| 2011/0276396 A1* | 11/2011 | Rathod .................. H04L 12/18 |
| | | 705/14.49 |
| 2014/0370879 A1* | 12/2014 | Redding ........... H04M 3/42178 |
| | | 455/419 |
| 2015/0100420 A1 | 4/2015 | Van Horn et al. |
| 2015/0149296 A1 | 5/2015 | Melcher et al. |
| 2018/0270608 A1* | 9/2018 | Thoresen ................ H04W 4/38 |
| 2018/0270612 A1* | 9/2018 | Thoresen .............. H04W 4/021 |
| 2020/0092201 A1* | 3/2020 | Tillotson ............. G06F 9/45558 |

* cited by examiner

VALIDATION IN A DECENTRALIZED NETWORK

REFERENCE TO RELATED APPLICATIONS

A claim for benefit of priority to the Dec. 21, 2018 filing date of the U.S. Provisional Patent Application No. 62/784,080, titled VALIDATION IN A DECENTRALIZED NETWORK (the '080 Provisional Application), is hereby made pursuant to 35 U.S.C. § 119(e). The entire disclosure of the '080 Provisional Application is hereby incorporated herein.

FIELD

The embodiments discussed herein are related to validation in decentralized networking.

BACKGROUND

The Internet of Things (IoT)—the network of connected "smart" devices that communicate seamlessly over the Internet—is expanding into every aspect of human life. Increasingly, IoT devices are being used for healthcare at hospitals, and in medical device and pharmaceutical manufacturing. In cities, IoT devices help track and monitor pollution. IoT devices can also be used by governments, militaries, companies, and individuals for asset tracking and management. Although these applications serve different purposes, they all share one characteristic—a dependence on strong connectivity. Soon, conventional networks will be unable to handle the bandwidth and power requirements required to support connections for billions of IoT devices.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system may include processing logic configured to execute instructions to cause a system to perform operations including receiving, from an intermediate device, data that originated at an endpoint node. The data may be associated with metadata that was associated with the data by the intermediate device. The operations may also include extracting one or more items from the metadata. The operations may include validating an activity of the intermediate device based on the one or more items that were extracted from the metadata.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
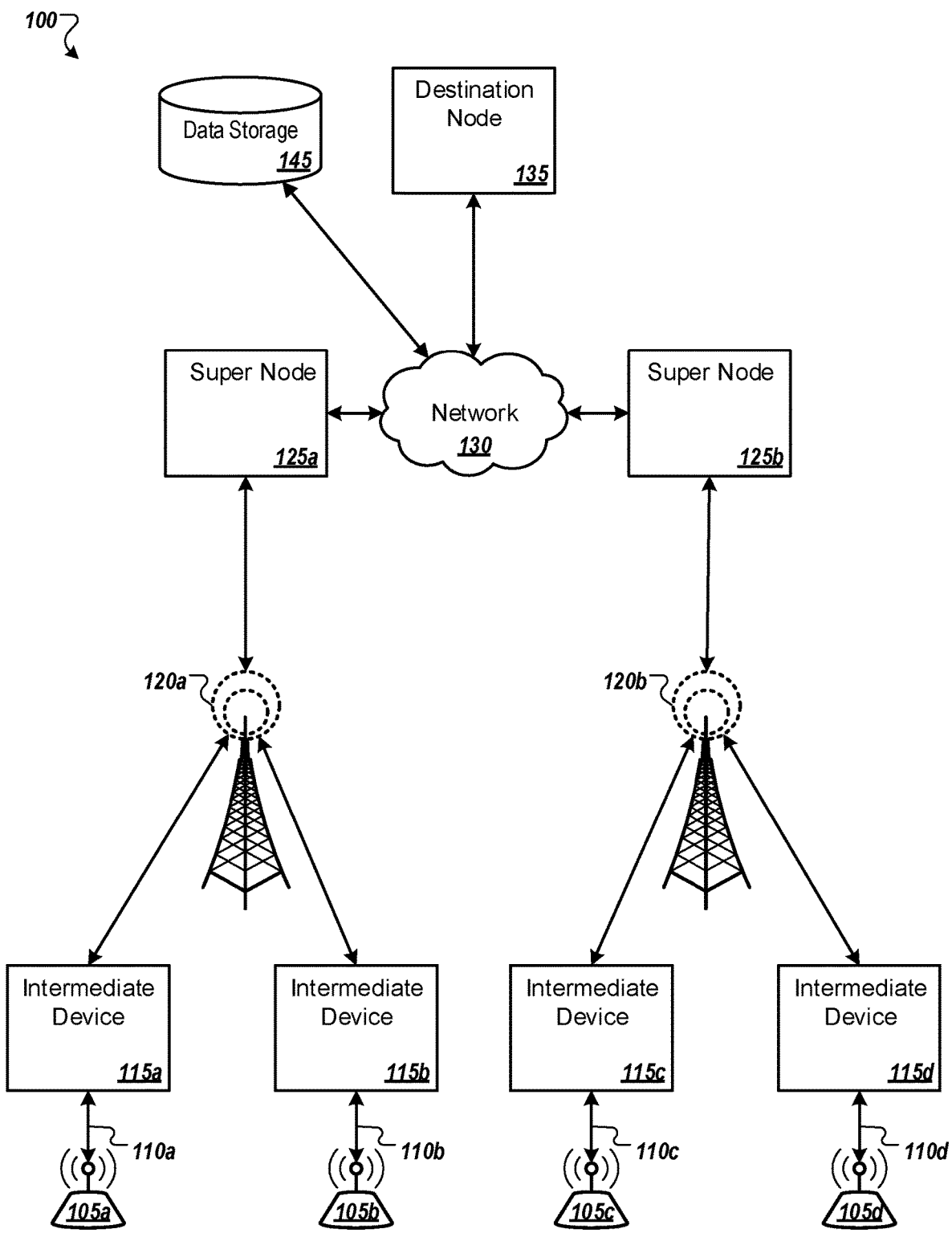
FIG. 1A illustrates an example network architecture in which embodiments of the present disclosure may be implemented.

The Internet of Things (IoT) is expanding into every aspect of human life. With over 75 Billion IoT devices expected to be deployed by 2025, a more efficient new network infrastructure is needed to bring these devices online and connect them to each other.

Many connectivity solutions exist for IoT devices. Unfortunately, all suffer problems of limited bandwidth, decreased connectivity, high power consumption, and/or high cost. For example, cellular connections may consume significant power in a device and may also be expensive. Low power solutions, such as a Low-Power Wide-Area Network (LP-WAN) may consume less power than cellular connections. LPWANs, however, may be constrained by limited bandwidth and may not be able to transmit enough data to fully serve the needs of distributed networks. Conventional systems may not consume a relatively low amount of power while still providing high bandwidth.

Specifically, to connect a small device to the Internet today, existing solutions include: (a) using an existing wireless network, for example, by incorporating a cellular module with a subscriber identification module (SIM) card or software SIM into the device to give it a cellular connection, (b) building a new alternative wireless network by incorporating a custom radio chipset and building fixed infrastructure to support this network, and (c) using long range network technology such as LoRa Alliance Technology. LoRa uses a complex "star-of-stars" topology of gateways and bridges between IoT devices and a "central network server" on the industrial, scientific and medical (ISM) spectrum band.

Each of these approaches have significant drawbacks. For example, each of these approaches require a significant amount of power which often is a major contributor to battery drain in mobile devices. Further, approach (a) requires expensive cellular modules and, in addition, a monthly fee for wireless cellular service for both, service subscription and data to a wireless carrier. Approaches (b) and (c) are also expensive, because they require building new, fixed infrastructure, and often require purchasing a chipset for radio transmission in addition to the popular Bluetooth® chipsets. The longer the transmission range, the greater the power requirement, so each of these approaches require significant power. Similarly, cellular devices and Global Positioning System (GPS) enabled devices require high power to communicate with a cell tower or satellites because of longer distances.

Aspects of the present disclosure address these and other problems with conventional networking by providing a new decentralized network. In some aspects, a decentralized network may connect numerous devices using less power while providing higher connectivity and/or bandwidth. An embodiment includes a crowd-sourced method for sending data from an IoT device to a server without relying on a fixed or centralized infrastructure. Another embodiment includes a crowd-sourcing method for a cloud server to send data to an IoT device without relying on a fixed or centralized infrastructure. A further embodiment includes a method for routing data (e.g., beacons and/or data packets) from multiple services on multiple IoT devices to the appropriate device manufacturer servers. Yet another embodiment includes a method to reduce energy consumption on mobile devices used to collect or exchange any volume of data with remote IoT devices, which may include two-way communication between devices.

In another aspect, storing the content locally on the intermediate device can serve the purpose of reaching out some IoT devices located in areas deprived of infrastructure network; such as underground or in remote places; and delivering the data whenever the intermediate device is within range of the IoT device using short range communication such as Bluetooth. Alternatively, the intermediate device can download some data using from the IoT device using short range communication and store it in its local cache, only to deliver it to the appropriate manufacturer servers whenever the intermediate device is back within range of a centralized infrastructure.

In one aspect, the present disclosure describes systems and techniques to improve upon existing technologies by obviating the need for separate, fixed infrastructure by using crowd-sourcing techniques. Some aspects provide a methodology for IoT device-to-server communication that has a low power consumption profile and does not require massive fixed hardware infrastructure. Other benefits of the present disclosure is in its ability to lower the cost of Internet access and to create a platform for new innovations in the field of IoT. Another benefit of the present disclosure is in its ability to increase reliability of data in the system through validation of every device and every activity of the device in the decentralized network.

The present disclosure may be useful to every field that uses network-based communications. Example parties that may benefit from this disclosure include, but are not limited to, smartphone manufacturers, bike, scooter and ride sharing companies, outdoor advertisers, environmental analytics companies, etc. Example applications may include use for pollution tracking, asset tracking, finding lost devices, industrial predictive maintenance, etc. Further, aspects of the present disclosure may not rely on connectivity using SIM or LPWAN modems, which enables devices to be smaller and more efficient.

For example, in location tracking of devices and assets scenarios, most low-cost tracking device makers rely on app users to locate devices, and do not have sufficient app density to provide global coverage. Adding a cellular module and a GPS module is expensive and power hungry. Aspects of the present disclosure may provide a solution that does not require endpoint devices to include cellular or GPS modules which interoperates globally and lowers costs.

In an example of low power sensor connectivity, the cost of some sensors is so low that adding cellular or GPS connectivity can be an order of magnitude more expensive than the cost of the sensor. Aspects of the present disclosure may provide a connectivity service at a radically lower cost.

Some aspects may also be used for firmware updates, updating date and time of devices, creating a wearable device network, data IP connectivity, measuring population density (such as by detecting the number of Bluetooth® devices in a given location), checking the presence of a specific device for insurance companies, detecting trends of sales of a specific device for market analytics companies, hedge funds and private equity companies, etc. In at least one embodiment, storing firmware updates, software or content locally on intermediate devices can serve a purpose of reducing latency and can also advantageously use the edge of a network to perform content distribution, software or firmware updates or installations.

Further, in such systems, without careful planning, bad actors may enter the system and send bad data. This type of behavior may have a negative and lasting impact on a decentralized network. To combat bad actors in such a decentralized network, the present disclosure provides various techniques for validation and verification of activities in the decentralized network. In at least one embodiment, rewards may be given for validated activities. In at least one embodiment, penalties may be dispensed for activities that may harm the integrity of the decentralized network.

FIG. 1A illustrates an example network architecture 100 in which embodiments of the present disclosure may be implemented. The network architecture 100 may include one or more endpoint devices 105, one or more intermediate devices 115, one or more super nodes 125, and one or more destination nodes 135. In some embodiments, the network architecture 100 may be capable to move data between one or more endpoint devices 105 and various destination nodes 135 by way of one or more crowd-sourced intermediate devices 115, which may function as network clients, and one or more super nodes 125.

An endpoint device 105 may include one or more IoT devices. The endpoint device 105 may include a power supply, a data collection device (e.g., a sensor), and a network device. The power supply may include a battery or a connection to a power grid. Additionally, or alternatively, the power supply may include an energy harvesting apparatus, such as a solar panel, solar cell, solar photovoltaic, electromagnetic, etc. In at least some embodiments, the endpoint device 105 may not include a power supply and may instead use ambient backscatter techniques. The endpoint device 105 may also include one or more sensors. The one or more sensors may be configured to detect any type of condition, and generate electronic data based on a detected condition.

For example, the endpoint device 105 may include a smart watch with a heart rate monitor that is configured to generate heart rate data using heart rate conditions collected by the heart rate monitor. In at least one embodiment, the endpoint device 105 does not have capability to communicate over the Internet and only includes hardware and/or software capable of communicating with nearby devices, such as a nearby intermediate device 115.

The network device of the endpoint device 105 may include any hardware, software, or combination thereof that is capable to communicate with another device via a network. In at least one embodiment, the network device may include any network controller configured to communicate via a short-range network, such as Bluetooth® or any other short-range network. In at least one embodiment, the network device may include any network controller configured to communicate via any network of any range. In at least one embodiment, the network device may include any network controller configured to communicate via a low-power network. Example endpoint devices 105 include, but are not limited to, industrial devices, residential appliances, commercial equipment, inventory trackers, smart watches, wearables, heart rate monitors, logistics trackers, environmental sensors, cash registers, credit card readers, point-of-sale (POS), bikes, electric scooters, electric skate boards, cars, electric cars, satellites, a Bluetooth® tag, Bluetooth® sticker, or any device (mobile and not mobile that includes a wireless radio interface. The network architecture 100 may include any number of endpoint devices 105 and the endpoint devices 105 in the network architecture 100 may be any type of endpoint device 105, including any type of network-capable device. The endpoint devices 105 may be fixed or relatively stationary in the network architecture 100, such as a POS or a pollution sensor. Additionally, or alternatively, the endpoint devices 105 may be mobile, such as a smart watch, or any car or vehicle.

The one or more endpoint devices 105 may be configured to communicate with other devices via at least one wireless network 110. For example, a first endpoint device 105a may be in electronic communication with a first intermediate device 115a via a wireless network 110a. The one or more intermediate devices 115 may include any type of device capable of communicating with an endpoint device 105 via the wireless network 110 and with a super node 125 via the wireless network 110 and/or via a second network 120. In at least one embodiment, an intermediate device 115 may include two network controllers—a first network controller to communicate via the wireless network 110 and a second network controller to communicate via the second network 120. Example intermediate devices 115 include personal computers (PC), laptops, smart phones, netbooks, e-readers, personal digital assistants (PDA), cellular phones, mobile phones, tablets, vehicles, drones, cars, trucks, wearable devices, routers, televisions, or set top boxes, etc.

As illustrated, the first endpoint device 105a may be in electronic communication with the first intermediate device 115a via the wireless network 110a (e.g., a short-range network). Further, a second endpoint device 105b may be in electronic communication with a second intermediate device 115b via another wireless network 110b (e.g., a low-power network). A third endpoint device 105c may be in electronic communication with a third intermediate device 115c via another wireless network 110c. A fourth endpoint device 105d may be in electronic communication with a fourth intermediate device 115d via another wireless network 110d.

In some embodiments, the wireless network 110 may be any network that uses a relatively low amount of power. Example wireless networks 110 may include any Bluetooth® network type (e.g., Bluetooth Low Energy (BLE), Bluetooth 4.0, Bluetooth 5.0, Bluetooth Long Range), NB-IoT, LTE Direct, LTE-M, LTE M2M, 5G, Wi-Fi, Wi-Fi Aware, data-over-sound, qrcode, or any network. The one or more endpoint devices 105 may connect to various intermediate devices 115 using different types of wireless networks 110. For example, the first endpoint device 105a may be in electronic communication with the first intermediate device 115a via a first short-range wireless network 110a and the second endpoint device 105b may be in electronic communication with the second intermediate device 115b via a second short-range wireless network 110b.

Endpoint devices 105, intermediate devices 115, or both, may be fixed, relatively stationary or moveable. When an endpoint device 105 and an intermediate device 115 come into wireless range of each other, the endpoint device 105 and the intermediate device 115 may perform a handshake and/or authentication to initiate data exchange between the endpoint device 105 and the intermediate device 115.

In some embodiments, the endpoint device 105 may periodically send data (e.g., a beacon and/or a data packet) via the wireless network 110. The endpoint devices 105 may include various services that may run on the endpoint devices 105. For example, a smart watch may include a clock service, a heart rate monitor service, a motion detection service, a music service, etc. Beacons or data packets may be generated for each of these services or a single beacon or data packet may be generated to include data for some or all of the services.

An intermediate device 115 may listen for such data from endpoint devices 105. Responsive to receiving data, the intermediate device 115 may send the data to a super node 125 via a network, such as the second network 120. In at least one embodiment, the wireless network 110 and the second network 120 are different types of networks. For example, the wireless network 110 may be a Bluetooth® network and the second network 120 may be a cellular network, Wi-Fi, or the Internet. In at least one embodiment, the intermediate device 115 may use a directory to locate the super node 125. Additionally, or alternatively, the intermediate device 115 may identify more than one super node 125, and may select one of the super nodes 125 in which to send the data. The intermediate device 115 may select the super node 125 based on proximity, latency, or any other factor. The second network 120 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof.

The one or more super nodes 125 may include one or more computing devices, such as a rackmount server, a router computer, a server computer, a personal computer, a mainframe computer, a laptop computer, a tablet computer, a desktop computer, a smartphone, a car, a drone, a robot, a vehicle, or any mobility device that has an operating system, etc.), data stores (e.g., hard disks, memories, databases), networks, software components, and/or hardware components.

The one or more super nodes 125 may perform functions related to one or more of data routing, activity validation, storage, and insight management. These particular functions are described in further detail in conjunction with FIG. 2. For example, the super node 125 may validate activities performed by the intermediate devices 115a and 115b. The super node 125 may validate activities performed by the intermediate devices 115c and 115d. In at least one embodiment, any super node 125 may validate activities of any intermediate device 115.

The super node 125 may include or be coupled to a data storage 145. The data storage 145 may include any memory or data storage. In at least one embodiment, the data storage 145 uses the InterPlanetary File System (IPFS). In some embodiments, the data storage 145 may include computer-readable storage media for carrying or having computer-executable instructions or data structures stored thereon. The computer-readable storage media may include any available media that may be accessed by a general-purpose or special-purpose computer, such as a processor. For example, the data storage 145 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 145. In the depicted embodiment, the data storage 145 is separate from the super node 125 and is accessible via a network 130. In some embodiments, the data storage 145 may be part of the super node 125. In at least one embodiment, the data storage 145 may include multiple data storages. The data storage 145 may include routing data, validation data, storage data, and insight data, as further described in conjunction with FIG. 2.

The one or more super nodes 125 may be configured to receive data from the intermediate device 115. The one or more super nodes 125 may send the data (or other information related to or associated with the received data) to a destination node 135.

The one or more super nodes 125 may send the data, or other information related to the data, to a destination node 135 via a third network 130. The third network 130 may include a public network (e.g., the Internet), a private network (e.g., a local area network (LAN) or a wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof. In at least one embodiment, the second network 120 and the third network 130 are the same network or include at least some overlapping components. In at least one embodiment, the first network 110, the second network 120, and the third network 130 are part of the same network or include at least some overlapping components.

The destination node 135 may include one or more computing devices, such as a rackmount server, a router computer, a server computer, a personal computer, a mainframe computer, a laptop computer, a tablet computer, a desktop computer, a smartphone, a car, a drone, a robot, or any mobility device that has an operating system etc.), data stores (e.g., hard disks, memories, databases), networks, software components, and/or hardware components. The destination node 135 may be associated with one or more endpoint devices 105. For example, an entity may sell or purchase an endpoint device 105 and may use the destination node 135 to communicate with and/or control the endpoint device 105. In at least one embodiment, the destination node 135 and at least one of the endpoint devices 105 are manufactured and/or sold by different entities.

The destination node 135 may send one or more messages to a particular endpoint device 105, or a set of endpoint devices 105. For example, the destination node 135 may send updates (e.g., firmware, software) to the particular endpoint device 105, or the set of endpoint devices 105. The destination node 135 may send other communications to an endpoint device 105, such as a response to a request from a beacon generated by the particular endpoint device 105, or any other type of communication.

In at least one embodiment, the one or more super nodes 125 may receive a message from the destination node 135 and, in some embodiments, the one or more super nodes 125 may send the message from the destination node 135 to an intermediate device 115. In at least some embodiments, the intermediate device 115 may perform one or more operations responsive to receiving the message from the destination node 135. The operations may include operations local to the intermediate device 115, and/or sending the message from the destination node 135 to an endpoint device 105.

Modifications, additions, or omissions may be made to the network architecture 100 without departing from the scope of the present disclosure. The present disclosure more generally applies to the network architecture 100 including one or more endpoint devices 105, one or more wireless networks, one or more intermediate devices 115, one or more second networks 120, one or more super nodes 125, one or more third networks 130, and one or more destination nodes 135 or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 1B:
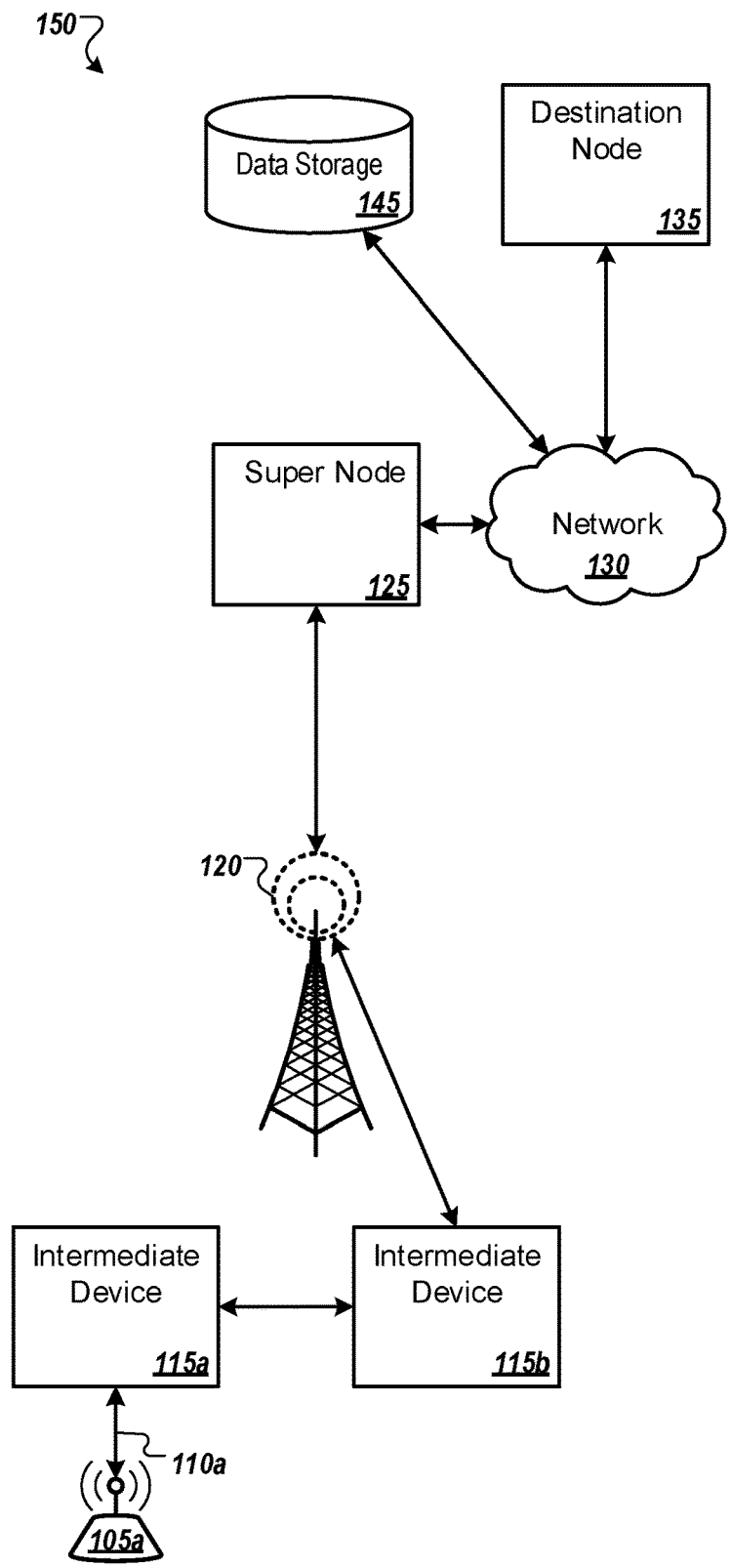
FIG. 1B illustrates an example network architecture in which embodiments of the present disclosure may be implemented.

FIG. 1B illustrates an example network architecture 150 in which embodiments of the present disclosure may be implemented The network architecture 150 may include components illustrated and described in FIG. 1A, such one or more endpoint devices 105, one or more intermediate devices 115, one or more super nodes 125, one or more destination nodes 135, and one or more data storages 145.

In at least one embodiment, the one or more super nodes 125 may receive a message from the destination node 135 and, in some embodiments, the one or more super nodes 125 may send the message from the destination node 135 to an intermediate device 115*b*. In at least some embodiments, the intermediate device 115*b* may perform one or more operations responsive to receiving the message from the destination node 135. The operations may include operations local to the intermediate device 115*b*, and/or sending the message from the destination node 135 to another intermediate device 115*a*. Any number of intermediate devices 115 may be implemented, and may be configured in a mesh network. The intermediate device 115*a* may perform one or more operations responsive to receiving the message from the intermediate device 115*b*, such as operations local to the intermediate device 115*a*, and/or sending the message from the destination node 135 to an endpoint device 105 via network 110*a*.

The endpoint device 105 may also send a message to the intermediate device 115*a*. Rather than directly sending the message to the super node 125 via network 120, the intermediate device 115*a* may send the message to any number of intermediate devices 115. As illustrated, the intermediate device 115*a* may send the message to the intermediate device 115*b*, but any number of intermediate devices may be used to ultimately route the message to the super node 125. In at least one embodiment, the intermediate device 115*a* may select another intermediate device 115 when the intermediate device 115 is closer in proximity to the intermediate device 115*a* as compared to the super node 125. Any factor may be used by the intermediate device 115*a* to decide where to send the message, including a latency between the intermediate device 115*a* and the super node 125, a latency between the intermediate device 115*a* and another intermediate device 115*b*, etc.

The super node 125 may send the message to the destination node 135 via the network 130.

Figure 2:
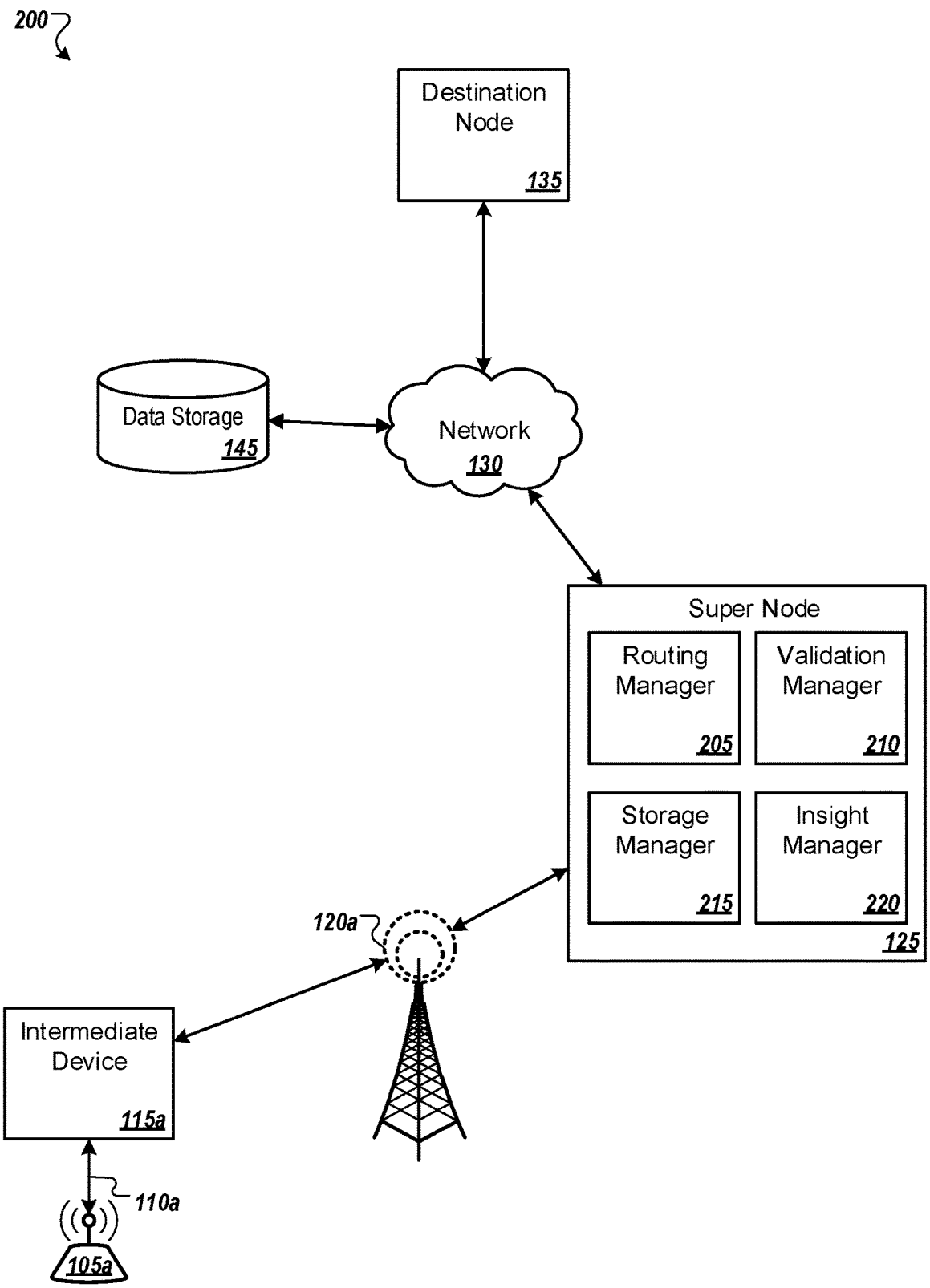
FIG. 2 illustrates another example network architecture in which embodiments of the present disclosure may be implemented.

FIG. 2 illustrates another example network architecture 200 in which embodiments of the present disclosure may be implemented. The network architecture 200 may include components illustrated and described in FIG. 1A or 1B, such one or more endpoint devices 105, one or more intermediate devices 115, one or more super nodes 125, one or more destination nodes 135, and one or more data storages 145.

The data storage 145 may include various data that may be used by the super node 125. For example, the data storage 145 may include routing data that may be used for routing data, validation data that may be used to validate activities of the intermediate device 115, storage data for storing various data received by the super node 125, and insight data that may be used to generate information and statistics related to the system 200 and operations performed therein.

In particular, FIG. 2 illustrates a super node 125 that may perform routing, validation, storage, and insight operations. For example, the super node 125 may validate activities of the intermediate device 115. The super node 125 may include one or more of a routing manager 205, a validation manager 210, a storage manager 215, and/or an insight manager 220.

The routing manager 205, the validation manager 210, the storage manager 215, and/or the insight manager 220 each may be implemented using hardware including a processor, a microprocessor (e.g., to perform or control performance of one or more operations), an FPGA, or an ASIC. In some other instances, the routing manager 205 may be implemented using a combination of hardware and software. Implementation in software may include rapid activation and deactivation of one or more transistors or transistor elements such as may be included in hardware of a computing system (e.g., the super node 125). Additionally, software defined instructions may operate on information within transistor elements. Implementation of software instructions may at least temporarily reconfigure electronic pathways and transform computing hardware.

The routing manager 205 may route data pertaining to the endpoint devices 105, intermediate devices 115, and destination nodes 135. To route the data, the routing manager 205 may track and/or access relationships between the endpoint devices 105, intermediate devices 115, and destination nodes 135. For example, the routing manager 205 may access, in the data storage 145, routing data, such as a routing table or list of endpoint devices that are associated with a particular destination node 135.

The routing manager 205 may process communications between the endpoint device 105, the intermediate device 115 and the destination node 135. In an example, the routing manager 205 may receive data (e.g., a beacon and/or a data packet) from the intermediate device 115 via the second network 120. The data may have been sent to the intermediate device via the wireless network 110 by endpoint device 105. The data may contain characteristics about the endpoint device 105, including an identifier of the endpoint device 105 (e.g., a MAC address, a unique ID), a geographical location of the endpoint device 105, and advertisements of the UUIDs of the services it supports, etc. The routing manager 205 may identify the characteristic of the endpoint device 105, such as by analyzing the data to identify information pertaining to the endpoint device 105. The routing manager 205 may access the data storage 145 to identify, based on the characteristic of the endpoint device 105 in the data, a destination node 135 that is associated with the endpoint device 105 and/or the data. For example, the identifier of the endpoint device 105 may be associated with a particular manufacturer that operations a particular destination node 135. The routing manager 205 may identify this particular destination node 135 in the data storage 145 and an address and/or path to send the data in order to reach the destination node 135. In at least some embodiments, the routing manager 205 may send the data, or a beacon, or a data packet to the destination node 135 via the third network 130. The data may include a beacon, may not include a beacon, or may include information pertaining to the beacon and endpoint device 105.

In at least one embodiment, the data may include information and/or data from multiple services associated with the endpoint device 105. Additionally, or alternatively, multiple beacons or data packets from a single endpoint device 105 may be generated and broadcast via the wireless network 110. Each of these multiple beacons or data packets, for example, may be associated with a different service associated with the endpoint device 105. The routing manager 205 may identify the services, and based on information for the service, identify an appropriate destination node 135 that should receive the data.

The validation manager 210 may validate activities that are performed in the system 200. Because the super node 125 is not typically directly connected to the endpoint device 105, the super node 125 does not necessarily know whether the data actually came from the endpoint device 105. Simply trusting data from intermediate devices, the validation manager 210 may verify that the intermediate device sent accurate and actual data from the endpoint device 105. For example, the validation manager 210 may verify whether the intermediate device 115 actually processed data received from the endpoint device 105.

In at least one embodiment, the validation manager 210 may also attribute a reward for the intermediate device 115 for activities performed within the system 200. For example, the validation manager 210 may allocate cryptocurrency to the intermediate device 115 (or to an account associated with the intermediate device 115). To reduce the likelihood of rewarding a device that did not actually perform a particular activity, the validation manager 210 can validate the activity that was purportedly performed by the intermediate device 115 prior to allocating a reward.

In at least one embodiment, responsive to receiving data, the intermediate device 115 may send the data, along with metadata, to the super node 125. The validation manager 210 may identify the metadata and may use the metadata to verify activities of the intermediate device 115. The metadata may, for example, be additional information added to, or sent with, the data to the super node 125. The metadata may include data pertaining to data received from endpoint devices, such as a timestamp of the receipt of the data by the intermediate device 115, a timestamp associated with the creation of the data (e.g., beacon and/or data packet) by the endpoint device, a timestamp of the transmission of the data by the intermediate device 115 to the super node 125, a geolocation associated with the data and/or the endpoint device 105 that created or transmitted the data, sensor data associated with the endpoint device, a geolocation associated with the intermediate device 115, the type of network used to communicate the data from the endpoint to the intermediate device 115, an amount of data received by the endpoint device 105, an amount of data sent by the intermediate device 115, an amount of data received by the super node 125, endpoint device density, intermediate device density, latency, local sensors data from the intermediate device etc. The metadata may be stored as validation data in the data storage 145.

To validate the activity of the intermediate device 115, the validation manager 210 may extract the metadata from the communication that the super node 125 received from the intermediate device 115. For example, the validation manager 210 may extract one or more timestamps associated with the data. The validation manager 210, may for example, extract the timestamp of the receipt of the data by the intermediate device 115, the timestamp associated with the creation of the data by the endpoint device, the timestamp of the transmission of the data by the intermediate device 115 to the super node 125, and may also determine a timestamp for when the super node 125 received the data. The validation manager 210 may compare at least some of these timestamps to ensure that they make sense. For example, the validation manager 210 may check to see whether the timestamp chronology matches the expected route of the data. The timestamp of the data creation, for example, should precede any other timestamp and the receipt of the data at the super node 125 should follow any other timestamp. In at least one embodiment, when the validation manager 210 determines that timestamps chronologically fit the expected travel path, the validation manager 210 may determine that the intermediate device 115 did in fact receive the data from the endpoint device 105. The validation manager 210 may then attribute a reward to the intermediate device 115 for performing such activity.

In at least one embodiment, the validation manager 210 may validate the activity of the intermediate device 115 using two or more timestamps. The validation manager 210 may identify a timestamp associated with the data received from the intermediate device 115. To validate the activity, the validation manager 210 may identify different date with different timestamps. For example, the validation manager 210 may identify different data from the intermediate device 115. Additionally or alternatively, the validation manager 210 may identify different data from different intermediate devices 115 that are within a predetermined geographical region. The validation manager 210 may compare the different timestamps with the timestamp associated with the data. The validation manager 210 may determine that the different timestamps with the timestamp associated with the data are within a similarity threshold. For example, the validation manager 210 may determine that the timestamp chronology for the different timestamps with the timestamp associated with the data matches an expected route and timing of the data. The validation manager 210 may validate the activity of the intermediate device based on the determination that determining that the extracted timestamps with the timestamp associated with the data are within the similarity threshold.

Other validation schemes are myriad. For example, the validation manager 210 may use any or all, or any combination, of the metadata as part of the validation. The validation manager 210 may, for example, determine, such as through the metadata, that the endpoint device 105 used a short-range network to send the data to the intermediate device 115. Knowing this, the validation manager 210 may then compare the geo-location of the endpoint device 105 and the intermediate device 115 for similarity, since short-range communication was used between the endpoint device 105 and the intermediate device 115. Responsive to a determination that the geolocation of the endpoint device 105 and the geolocation of the intermediate device 115 are within a threshold range, the validation manager 210 may determine that the intermediate device 115 did in fact receive the data from the endpoint device 105.

In at least one embodiment, metadata from multiple intermediate devices 115 may be used to perform validation. In at least one embodiment, validation managers 210 on multiple intermediate devices 115 may function as a cluster of validation nodes. For example, multiple intermediate devices 115 that are close in proximity to each other (e.g., in a same room, in a same building, near-by outside, etc.) may receive similar information from multiple connected devices. In at least one embodiment, the multiple intermediate devices 115 may each receive a similar set of data from nearby endpoint devices 105. To the extent that the multiple intermediate devices 115 are not in the exact same location, the multiple intermediate devices 115 may not receive exactly the same data as each other but may receive at least a few of the same data (e.g., beacons, data packets). To validate a particular activity of a particular intermediate device 115, the validation manager 210 may query the validation data in the data storage 145 to determine whether any other received metadata is similar to the metadata associated with the particular intermediate device 115. For example, the validation manager 210 may identify a geolocation of the particular intermediate device 115 and may search the validation data in the data storage 145 for similar geolocations. Responsive to identifying a similar geolocation associated with a second intermediate device, the validation manager 210 may inspect any data associated with the second intermediate device to determine similarity with data associated with the particular intermediate device 115. For example, the validation manager 210 may determine that the data received from the particular intermediate device 115 included a payload. The validation manager 210 may determine whether the second intermediate device also sent the payload to the super node 125. Responsive to a determination that the second intermediate device also sent the payload to the super node 125, the validation manager 210 may validate the activity of the particular intermediate device 115.

Similar to the above example, instead of or in addition to comparing payloads, the validation manager 210 may determine whether the second intermediate device received two or more beacons or data packets that were also received by the particular intermediate device 115 as part of the validation. Responsive to a determination that the second intermediate device received two or more beacons or data packets that were also received by the particular intermediate device 115, the validation manager 210 may validate the activity of the particular intermediate device 115.

Similar to the above examples, the validation manager 210 may determine whether two or more intermediate devices received the data (or more than one of the same beacons or data packets) that were also received by the particular intermediate device 115 as part of the validation. Responsive to a determination that two or more intermediate devices received the data (or more than one of the same beacons or data packets) that were also received by the particular intermediate device 115, the validation manager 210 may validate the activity of the particular intermediate device 115.

Moreover, the validation manager 210 may also inspect for completeness of data for similarly located intermediate devices. For example, the validation manager 210 may determine that a set of intermediate devices send substantially similar data to the super node 125 and an outlier intermediate device (that has a geolocation that is a similar geolocation as the set of intermediate devices) sends incomplete data to the super node 125, as compared to data received by the super node 125 by the set of intermediate devices.

In at least one embodiment, to validate an activity, the validation manager 210 may inspect the payload and compare it to other received payloads. Responsive to determining that the payload has been received more than a threshold number of times, the validation manager 210 may decline to validate the activity because the sending intermediate device 115 may be sending inaccurate data in an effort to fraudulently receive a reward.

Further, the validation manager 210 may compare types of endpoint devices as part of the validation. For example, the super node 125 may receive data from multiple intermediate devices that indicate that multiple intermediate devices are in communication with a sensor, a television, a set-top box, a connected skateboard, a smart watch and a laptop. An outlier intermediate device with a similar geolocation as the multiple intermediate devices indicates communication with the sensor, television, set-top box, connected skateboard, smart watch and laptop, but the outlier intermediate device also indicates communication (such as by forwarding beacons or data packets) from additional devices. Responsive to determining that multiple intermediate devices each communicate with similar devices and that the outlier intermediate device also communicates with the additional devices, the validation manager 210 may determine that the outlier intermediate device is not sending true and accurate data to the super node 125. In response, the validation manager 210 may refrain from rewarding the outlier intermediate device, even for legitimate beacons or data packets because the outlier intermediate device appears to be attempting to trick the validation manager 210 into granting rewards for activities not actually performed by the outlier intermediate device. In at least one embodiment, the validation manager 210 may also cause a disconnection of the outlier intermediate device with the system 200. For example, the validation manager 210 may add the outlier intermediate device (or an identifier of the outlier intermediate device) to a blacklist. The blacklist may be used by the super node 125, or by any other component of the system 200, to refuse or block communications with the outlier intermediate device.

In at least one embodiment, multiple validation managers 210 may be used to validate activities based on a consensus between the multiple validation managers 210. In at least one embodiment, the multiple validation managers 210 may have a 100% consensus for validation. Alternatively, the multiple validation managers 210 may have less than a 100% consensus for validation, provided that the consensus is above a threshold consensus amount.

Additionally or alternatively, the validation manager 210 may use data mining, deep learning, artificial intelligence, cryptographic signatures in order to provide a more robust verification scheme and determine whether data is valid. For example, data mining could be used to estimate the expected route of a single IoT device 105 or intermediate device 115 so as to automatically compute a score of confidence on the trustability of an intermediate device by measuring the deviation between the received metadata sent by the intermediate device and the expected path.

Responsive to a successful validation of an activity, the validation manager 210 may attribute a reward for the activity to the intermediate device 115, or to an account associated with the intermediate device 115. Example rewards may include cryptocurrency, a title, a status, an upgrade, credits, etc.

Rewards may be different for different activities. Different data may have different values. For example, relaying a relatively small piece of data may be associated with a smaller reward than a larger reward for relaying a relatively larger piece of data. Additionally, or alternatively, an entity may adjust the reward for certain types of activities. For example, a particular entity may desire to collect data in a highly concentrated area and at a particular time (e.g., at a sports game). The entity may assign a bounty for validated data that are received from near the area and during the particular time. The validation manager 210 may attribute this bounty for activities that meet the criteria of the bounty that was set by the entity. In at least one embodiment, data collected in a first region may have a different value (e.g., higher or lower) than data collected in a second region.

In at least one embodiment, the super node 125 may receive the same data from two different intermediate nodes and the validation manager 210 may validate the activities of both of the different intermediate nodes. The validation manager 210 may, in some embodiments such as where the reward is a capped maximum reward, split or share the reward with the two different intermediate nodes. The split or share may be equal or unequal. For unequal splits or shares, the validation manager 210 may take into account any of the metadata. For example, the validation manager 210 may determine a first latency associated with a first intermediate node in relaying the data, and a second latency associated with a second intermediate node in relaying the data. The validation manager 210 may split the reward based on the latency. Any other metadata, or any other data may be used to split or share the reward with the any number of different intermediate nodes. Additionally, or alternatively, the validation manager 210 select one of the two different intermediate nodes to receive the whole of the reward. Similarly, the validation manager 210 may use any data to select one of the two different intermediate nodes to receive the whole of the reward. Similar to the example above, the validation manager 210 may select the first intermediate node when the first latency associated with the first intermediate node in relaying the data is shorter (e.g., faster) than the second latency associated with the second intermediate node.

In at least one embodiment, such as in an environment that includes a mesh network, a single intermediate device 115 may not alone relay data to the super node 125. Instead, multiple intermediate devices 115 may relay the data through a mesh network until the exit intermediate device sends the data to the super node 125. The reward, for example, may be divided among each of the intermediate devices that helped to relay the data to the super node 125. In at least one embodiment, the exit intermediate device may be afforded a higher portion of the reward for its role as the exit intermediary device. In at least one embodiment, the exit intermediate device may be afforded the entire reward for its role as the exit intermediary device.

The validation manager 210 may create a record of activities and contributions, on both an individualized and aggregate basis. For example, the validation manager 210 may create a record of activities and contributions associated with a particular user account (which may be associated with more than one intermediate device). In at least one embodiment, the validation manager 210 may create the record of activities and contributions in a hashed tree data structure and store the hash in the data storage 145 (e.g., the IPFS). In at least one embodiment, the validation manager 210 may write the hash, or a portion of the hash to a cryptocurrency transaction and/or to a blockchain.

In at least one embodiment, data received from intermediate devices may not be sent to a destination node 135. The storage manager 215 may cause the data to be stored and indexed for later retrieval for validation, or for other purposes.

The insight manager 220 may generate various statistics and reports based on all data that touches a super node 125. For example, the insight manager 220 may identify how many activities are validated by a particular validation manager 210.

The network architecture 100 may be used to exchange any volume of data between any devices capable of network-based communication in a manner that is different than conventional communication over the Internet.

In an example, the network architecture 100 may leverage existing smartphone infrastructure to create connectivity that is alternative to conventional Internet communication. In at least one embodiment, the network architecture 100 can move data to the cloud in an initially delay tolerant fashion, which may be useful for many types of IoT communications such as firmware updates, status updates, log-file storage, and micropayments. The intermediate device may include software that runs on smartphones to periodically scan for other devices (e.g., the endpoint devices 105) like industrial devices, smartwatches, wearables, logistics trackers, and environmental sensors. These endpoint devices 105 may connect with the software client running on the smartphones to create massive, area wide networks for moving data to and within the cloud. The present disclosure may be used to validate communications over this new network.

Further, it has been estimated that 95% of the human population is covered by some sort of cellular service. The network architecture 100 can be deployed anywhere in the world and enables regions of lower connectivity to increase their connectivity. Moreover, the network architecture 100 can provide coverage beyond the reach of conventional cellular networks by using software that runs on Bluetooth®-enabled smartphones, for example. Users may travel to areas of limited or no cellular connectivity, but still may receive data from endpoint devices 105 via the wireless network 110. Using the network architecture 100, telco operators, for example, can now easily deploy a software update to their user devices to begin communicating with endpoint devices 105 as described herein to provide higher latency IoT connectivity to even the remotest regions of the world.

In a specific example, the network architecture 100 can be used for asset tracking and management. For example, the network architecture 100 can be used to find lost items that are configured as an endpoint device 105, such as a skateboard with a wireless radio chipset, an attached tracking beacon, a Bluetooth tag or sticker, a laptop, etc. A user, for example, may indicate that the item is lost, such as by using a mobile application or website to indicate, to the destination node 135 or to the super node 125, that the item is lost. In a first embodiment, the destination node 135 may send a message to one or more super nodes 125 to watch for the lost item. The super nodes 125 may add an identifier of the lost item to a lost item watch list. As intermediate devices 115 move to different geographic locations, they can receive data from different endpoint devices 105. The intermediate devices 115 then forward the data to the super nodes 125. When a super node 125 server receives data, the super node 125 can analyze the data to validate whether the data originated at an endpoint device 105 that is on the watch list. When the super node 125 identifies data that originated at an endpoint device 105 that is on the watch list, the super node 125 can notify the destination node 135 that the lost item has been found. In at least some embodiments, the super node 125 may send the notification that the lost item has been found as a push notification or as a pull notification (i.e., in response to a request from the destination node 135). In at least some embodiments, the super node 125 may send the notification that the lost item has been found to the user device that was used by the user to indicate that the item was lost.

Modifications, additions, or omissions may be made to the network architecture 200 without departing from the scope of the present disclosure. The present disclosure more generally applies to the network architecture 200 including one or more endpoint devices 105, one or more wireless networks, one or more intermediate devices 115, one or more second networks 120, one or more super nodes 125, one or more third networks 130, and one or more destination nodes 135 or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components. The opposite may also apply; for example, as illustrated in FIG. 2, the routing manager 205, validation manager 210, storage manager 215, and insight manager 220 are all part of a single super node 125. A super node 125, however, may include all or fewer than all of these managers. For example, a super node 125 dedicated to routing may only include the routing manager. Similarly, a super node 125 dedicated to validation may only include the validation manager 210. In such instances, the various managers may still communicate with each other, such as via a network. Moreover, any of the routing manager 205, validation manager 210, storage manager 215, and insight manager 220 may be part of, or execute on, any device. For example, an intermediate device 115 may also include a validation manager 210 that may validate activities of the intermediate device 115, as well as other intermediate devices. In such embodiments, the validation manager 210 may be physically or logically separated from other portions of the intermediate device 115, so as to preserve the integrity of the validation manager 210.

Figure 3:
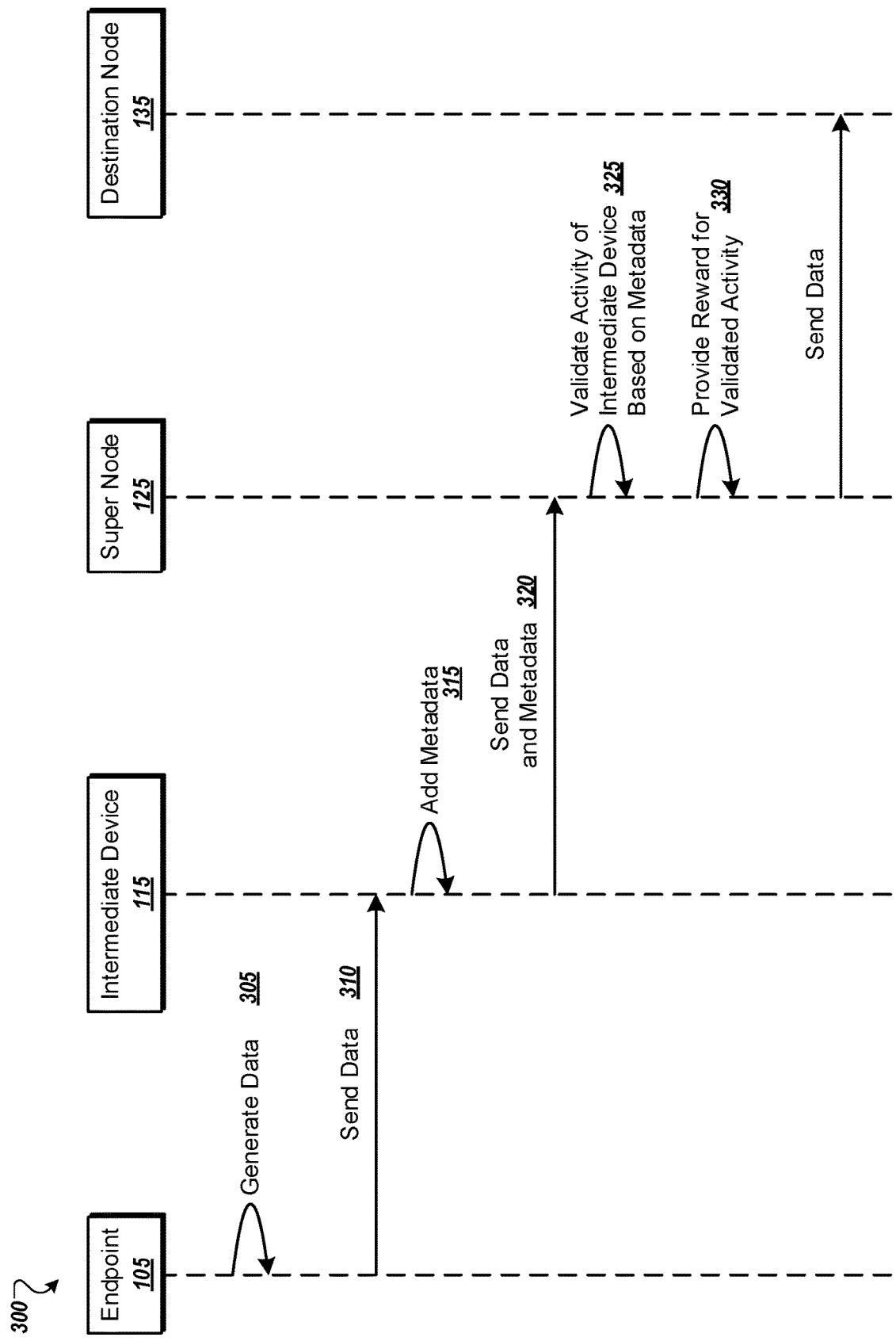
FIG. 3 illustrates an example sequence diagram of a process to validate activity in a network.

FIG. 3 illustrates an example sequence diagram 300 of a process to validate activity in a network. The sequence diagram 300 may include components illustrated and described in FIGS. 1 and 2, such one or more endpoint devices 105, one or more intermediate devices 115, one or more super nodes 125, and one or more destination nodes 135.

At 305, the endpoint device 105 may generate data (e.g., a beacon, a data packet). At 310, the endpoint device 105 may broadcast the data. The intermediate device 115 may be listening for data and, at 310, the intermediate device 115 may receive the data.

At 315, the intermediate device 115 may add metadata to the packet. The metadata, for example, may include any metadata described herein, including a device identifier. In at least one embodiment, the device identifier may be anonymized, such as by using homomorphic encryption. In an example, the true identity of the intermediate devices may be stored in a container that is only accessible with a key. Externally, an anonymized identifier may be used for the device. At 320, the intermediate device 115 may send the data with the metadata to the super node 125.

At 325, the super node 125 may validate the activity of the intermediate device based on the metadata. For example, the super node 125 may validate or verify that the intermediate device 115 actually received (or is highly likely to have received) the data from the endpoint device 105. At 330, the super node 125 may provide a reward to the intermediate device 115 (or to an account associated with the intermediate device 115) for the validated activity. At 335, the super node 125 may optionally send the data to the destination node 135.

Figure 4:
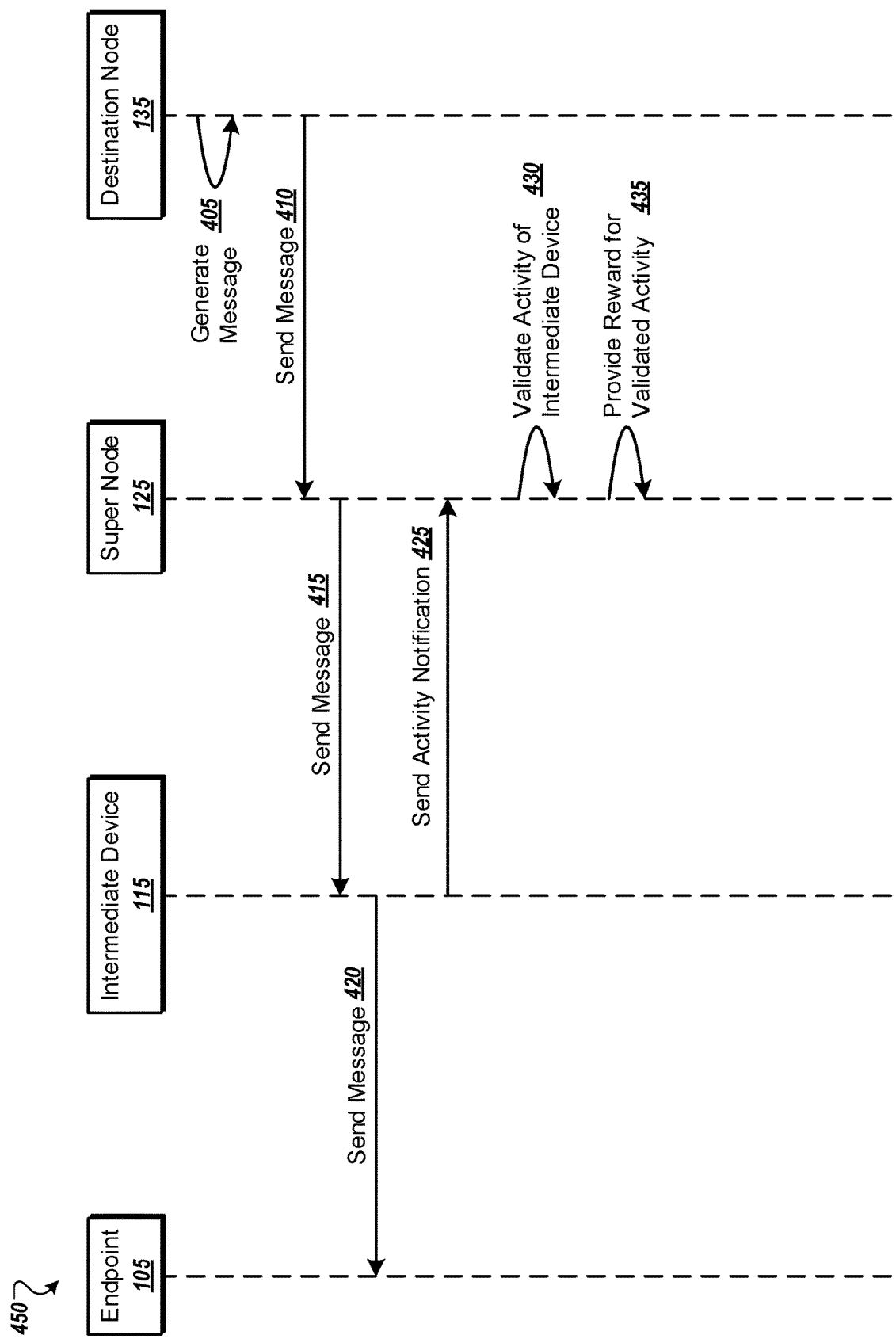
FIG. 4 illustrates another example sequence diagram of a process to validate activity in a network.

FIG. 4 illustrates another example sequence diagram 400 of a process to validate activity in a network. The sequence diagram 400 may include components illustrated and described in FIGS. 1 and 2, such one or more endpoint devices 105, one or more intermediate devices 115, one or more super nodes 125, and one or more destination nodes 135.

At 405, the destination node 135 may generate a message. The message may include any message, such as a response to receiving data. For example, the destination node 135 may generate a response message pertaining to the data. The response message may include a message intended for one or more of the super node 125, the intermediate device 115, the endpoint device 105 that generated the data, or another endpoint device 105 that did not generate the data. At 410, the destination node 135 may send the response message to the same super node 125 that sent the data to the destination node 135, or to a different super node 125 that did not send the data to the destination node 135.

The super node 125 may receive, from the destination node 135, the response message pertaining to the data. The super node 125 may process the response message, such as by performing operations at the super node 125 or by sending data to the intermediate device 115 at 415.

At 420, the intermediate device 115 may send the message to the endpoint 420. At 425, the intermediate device 115 may send an activity notification to the super node 125 to inform the super node 125 that the intermediate device 115 has performed the activity of sending the message to the endpoint device 105.

At 430, the super node 125 may validate the activity of the intermediate device based on the activity notification. For example, the super node 125 may validate or verify that the intermediate device 115 actually received (or is highly likely to have received) the data from the endpoint device 105. At 435, the super node 125 may provide a reward to the intermediate device 115 (or to an account associated with the intermediate device 115) for the validated activity.

Figure 5:
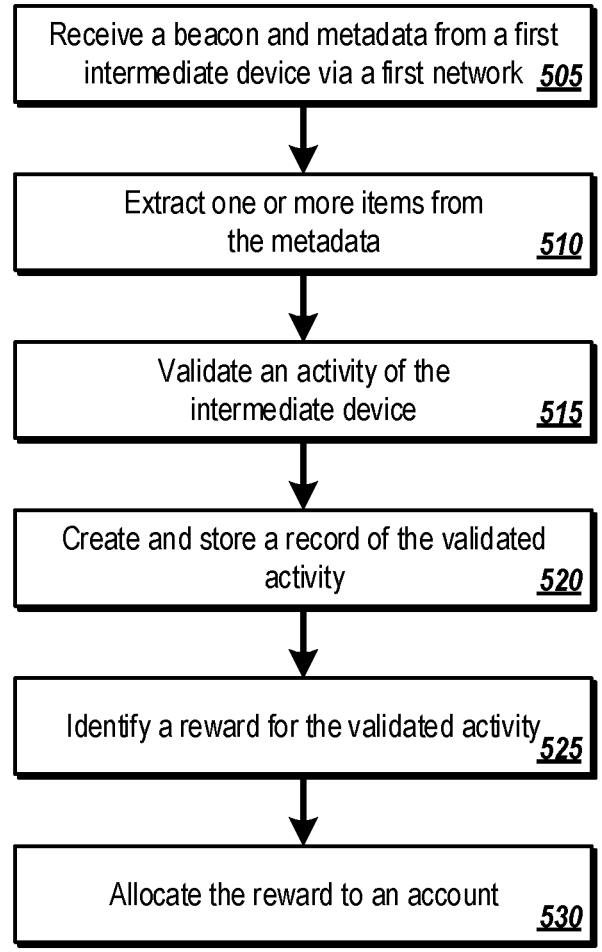
FIG. 5 illustrates a flow diagram of an example method related to validation in decentralized networking.

FIG. 5 illustrates a flow diagram of an example method 500 related to validation in decentralized networking. The methods may be performed by processing logic that may include hardware (circuitry, dedicated logic, etc.), software (such as is run on a general purpose computer system or a dedicated machine), or a combination of both, which processing logic may be included in the intermediate device 115 and/or the super node 125 of FIG. 1, 2, 3, or 4, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 5 illustrates a flow diagram of an example method 500 to validate the performance of an activity in a decentralized network. For example, the example method 500 may be performed to handle communications that were processed by an intermediate device (e.g., the intermediate device 115 of FIG. 1A or 1B).

The method 500 may begin at block 505, where processing logic may receive data from an intermediate device via a first network. The first intermediate device may include the intermediate device 115a of FIG. 1A or 1B, for example. The data may have been received by the first intermediate device from an endpoint device (e.g., the endpoint device 105a of FIG. 1A or 1B) via a second network (e.g., the wireless network 110a of FIG. 1A or 1B). In at least some embodiments, the first network is a longer-range network, or a higher-power network as compared to the second network. The data may be associated with metadata that was associated with the data by the intermediate device.

At block 510, the processing logic may extract one or more items from the metadata, which may include identifying a characteristic of the data. For example, the data may include data indicative of a geographical location of the endpoint device and an identifier of the endpoint device. Identifying the characteristic of the data may include scanning the data to identify the data indicative of the geographical location of the endpoint device and the identifier of the endpoint device.

At block 515, the processing logic may validate an activity of the intermediate device based on the extracted one or more items. In at least one embodiment, the extracted one or more items may include at least one geolocation associated with the data or the intermediate device. In at least one embodiment, validating the activity of the intermediate device based on the extracted one or more items may include comparing the geolocation associated with the data or the intermediate device with an expected geolocation for the data. In at least one embodiment, validating the activity of the intermediate device based on the extracted one or more items may include validating the activity of the intermediate device responsive to a determination that the geolocation associated with the data or the intermediate device and the expected geolocation for the data are within a threshold geographical distance. In at least one embodiment, validating the activity of the intermediate device based on the extracted one or more items may include refraining from validating the activity of the intermediate device responsive to a determination that the geolocation associated with the data or the intermediate device and the expected geolocation for the data are outside a threshold geographical distance. In at least one embodiment, refraining from validating the activity of the intermediate device may include imposing a penalty on the intermediate device responsive to the geolocation associated with the data or the intermediate device and the expected geolocation for the data are outside a threshold geographical distance.

In at least one embodiment, the extracted one or more items may include a geolocation of the intermediate device. In at least one embodiment, validating the activity of the intermediate device based on the extracted one or more items includes identifying a set of intermediate devices based on the geolocation of the intermediate device. Validating the activity of the intermediate device may also include identifying a set of data collected by the set of intermediate devices. Validating the activity of the intermediate device may further include comparing the extracted one or more items with the set of data collected by the set of intermediate devices. Validating the activity of the intermediate device may also include determining that the extracted one or more items and the set of data collected by the set of intermediate devices are within a similarity threshold. Validating the activity of the intermediate device may include validating the activity of the intermediate device based on the determination that determining that the extracted one or more items and the set of data collected by the set of intermediate devices are within the similarity threshold At block 520, the processing logic may create and store a record of the validated activity with a reference to an account that is associated with the intermediate device. In at least one embodiment, creating and storing the record of the validated activity with the reference to the account that is associated with the intermediate device may include appending the validated activity to an existing record of prior validated activities associated with the account. In at least one embodiment, creating and storing the record of the validated activity with the reference to the account that is associated with the intermediate device may include creating a summary of each activity in the record, generating a hash of the summary and storing the hash in a decentralized data storage system.

At block 525, the processing logic may identify a reward for the validated activity based at least in part on the one or more items from the metadata. At block 530, the processing logic may allocate the reward to the account that is associated with the intermediate device. In at least one embodiment, allocating the reward to the account that is associated with the intermediate device may include selecting the intermediate device from among a plurality of intermediate devices based on the extracted one or more items.

Figure 6:
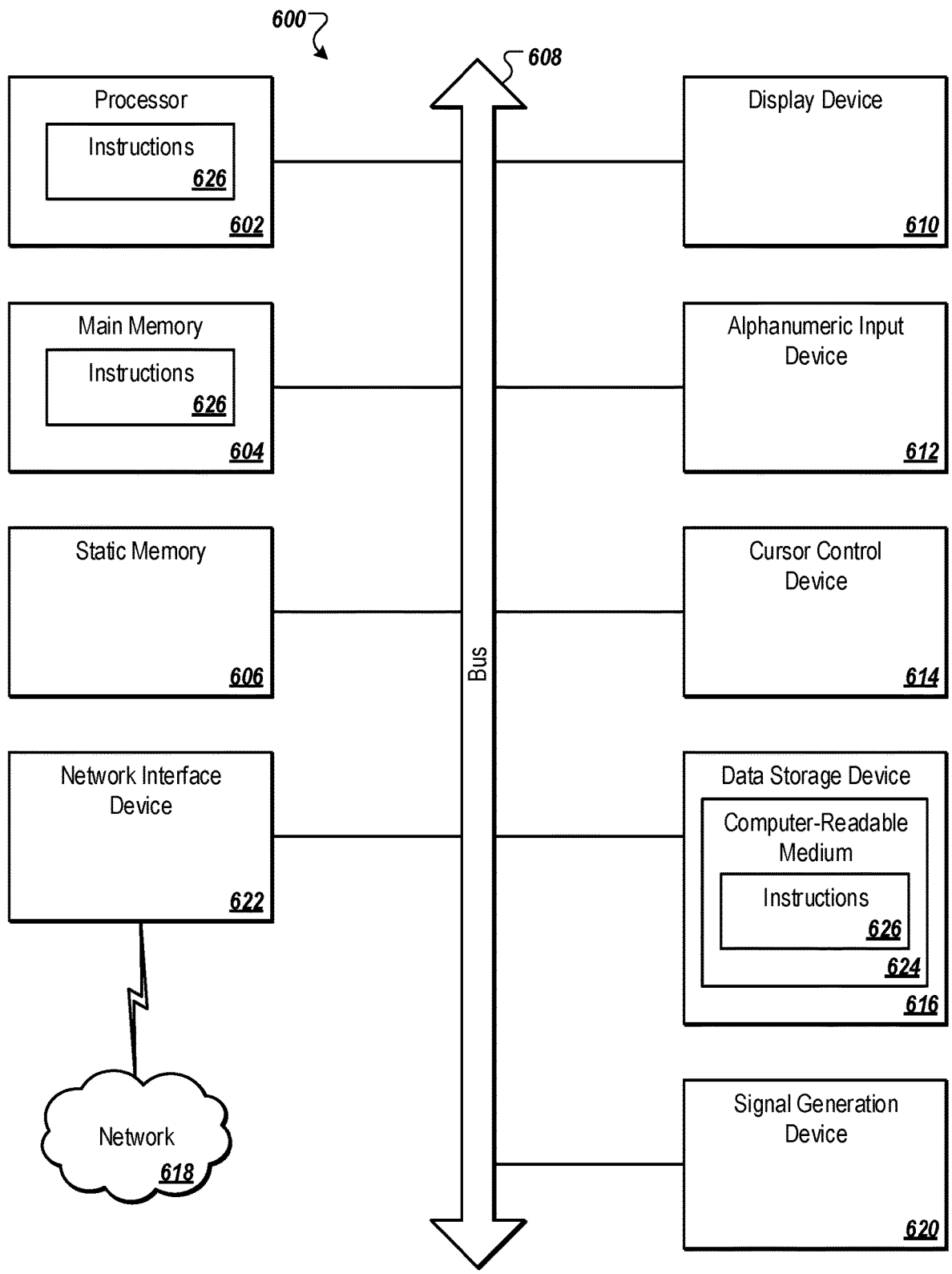
FIG. 6 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 6 illustrates a diagrammatic representation of a machine in the example form of a computing device 600 within which a set of instructions, for causing the machine to perform any one or more of the methods discussed herein, may be executed. The computing device 600 may include a mobile phone, a smart phone, a netbook computer, a rack mount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 616, which communicate with each other via a bus 608.

Processing device 602 represents one or more general-purpose processing devices such as a microprocessor, central processing unit, or the like. More particularly, the processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also include one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computing device 600 may further include a network interface device 622 which may communicate with a network 618. The computing device 600 also may include a display device 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker). In at least one embodiment, the display device 610, the alphanumeric input device 612, and the cursor control device 614 may be combined into a single component or device (e.g., an LCD touch screen).

The data storage device 616 may include a computer-readable storage medium 624 on which is stored one or more sets of instructions 626 embodying any one or more of the methods or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 618 via the network interface device 622.

While the computer-readable storage medium 626 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method, comprising:
   receiving, from an intermediate device, data that originated at an endpoint node, the data being associated with metadata that was associated with the data by the intermediate device;
   extracting one or more items from the metadata;
   validating an activity of the intermediate device based on the extracted one or more items;
   creating and storing a record of the validated activity with a reference to an account that is associated with the intermediate device, wherein creating and storing the record of the validated activity with the reference to the account that is associated with the intermediate device comprises appending the validated activity to an existing record of prior validated activities associated with the account;
   identifying a reward for the validated activity based at least in part on the one or more items from the metadata; and
   allocating the reward to the account that is associated with the intermediate device.

2. The method of claim 1, wherein the extracted one or more items includes at least one geolocation associated with the data or the intermediate device, wherein validating the activity of the intermediate device based on the extracted one or more items includes:
   comparing the geolocation associated with the data or the intermediate device with an expected geolocation for the data;
   responsive to a determination that the geolocation associated with the data or the intermediate device and the expected geolocation for the data are within a threshold geographical distance, validating the activity of the intermediate device; and
   responsive to a determination that the geolocation associated with the data or the intermediate device and the expected geolocation for the data are outside a threshold geographical distance, refraining from validating the activity of the intermediate device.

3. The method of claim 2, wherein refraining from validating the activity of the intermediate device includes imposing a penalty on the intermediate device responsive to the geolocation associated with the data or the intermediate device and the expected geolocation for the data are outside a threshold geographical distance.

4. The method of claim 1, wherein the extracted one or more items includes a geolocation of the intermediate device, wherein validating the activity of the intermediate device based on the extracted one or more items includes:
   identifying a set of intermediate devices based on the geolocation of the intermediate device;
   identifying a set of data collected by the set of intermediate devices;
   comparing the extracted one or more items with the set of data collected by the set of intermediate devices;
   determining that the extracted one or more items and the set of data collected by the set of intermediate devices are within a similarity threshold; and
   validating the activity of the intermediate device based on the determination that determining that the extracted one or more items and the set of data collected by the set of intermediate devices are within the similarity threshold.

5. The method of claim 1, wherein creating and storing the record of the validated activity with the reference to the account that is associated with the intermediate device further comprises:
   creating a summary of each activity in the record;
   generating a hash of the summary; and
   storing the hash in a decentralized data storage system.

6. The method of claim 1, wherein allocating the reward to the account that is associated with the intermediate device comprises selecting the intermediate device from among a plurality of intermediate devices based on the extracted one or more items.

7. A non-transitory machine-readable medium comprising a plurality of machine-readable instructions, the instructions executable to perform operations comprising:
   receive, from an intermediate device, data that originated at an endpoint node, the data being associated with metadata that was associated with the data by the intermediate device;
   extract one or more items from the metadata;
   validate an activity of the intermediate device based on the extracted one or more items;
   create and store a record of the validated activity with a reference to an account that is associated with the intermediate device, wherein creating and storing the record of the validated activity with the reference to the account that is associated with the intermediate device comprises appending the validated activity to an existing record of prior validated activities associated with the account;
   identify a reward for the validated activity based at least in part on the one or more items from the metadata; and
   allocate the reward to the account that is associated with the intermediate device.

8. The non-transitory machine-readable medium of claim 7, wherein the extracted one or more items includes at least one geolocation associated with the data or the intermediate device, wherein validating the activity of the intermediate device based on the extracted one or more items includes:
   comparing the geolocation associated with the data or the intermediate device with an expected geolocation for the data;
   responsive to a determination that the geolocation associated with the data or the intermediate device and the expected geolocation for the data are within a threshold geographical distance, validating the activity of the intermediate device; and
   responsive to a determination that the geolocation associated with the data or the intermediate device and the expected geolocation for the data are outside a threshold geographical distance, refraining from validating the activity of the intermediate device.

9. The non-transitory machine-readable medium of claim 8, wherein refraining from validating the activity of the intermediate device includes imposing a penalty on the intermediate device responsive to the geolocation associated with the data or the intermediate device and the expected geolocation for the data are outside a threshold geographical distance.

10. The non-transitory machine-readable medium of claim 7, wherein the extracted one or more items includes a geolocation of the intermediate device, wherein validating the activity of the intermediate device based on the extracted one or more items includes:
   identifying a set of intermediate devices based on the geolocation of the intermediate device;
   identifying a set of data collected by the set of intermediate devices;
   comparing the extracted one or more items with the set of data collected by the set of intermediate devices;
   determining that the extracted one or more items and the set of data collected by the set of intermediate devices are within a similarity threshold; and
   validating the activity of the intermediate device based on the determination that determining that the extracted one or more items and the set of data collected by the set of intermediate devices are within the similarity threshold.

11. The non-transitory machine-readable medium of claim 7, wherein creating and storing the record of the validated activity with the reference to the account that is associated with the intermediate device further comprises:
   creating a summary of each activity in the record;
   generating a hash of the summary; and
   storing the hash in a decentralized data storage system.

12. The non-transitory machine-readable medium of claim 7, wherein allocating the reward to the account that is associated with the intermediate device comprises selecting the intermediate device from among a plurality of intermediate devices based on the extracted one or more items.

13. A system, comprising:
   a memory; and
      one or more processors operatively coupled to the memory, the one or more processors being configured to execute operations to cause the system to perform operations comprising:
         receive, from an intermediate device, data that originated at an endpoint node, the data being associated with metadata that was associated with the data by the intermediate device;
         extract one or more items from the metadata;
         validate an activity of the intermediate device based on the extracted one or more items;
         create and store a record of the validated activity with a reference to an account that is associated with the intermediate device, wherein creating and storing the record of the validated activity with the reference to the account that is associated with the intermediate device comprises appending the validated activity to an existing record of prior validated activities associated with the account;

identify a reward for the validated activity based at least in part on the one or more items from the metadata; and allocate the reward to the account that is associated with the intermediate device.

14. The system of claim 13, wherein the extracted one or more items includes at least one geolocation associated with the data or the intermediate device, wherein validating the activity of the intermediate device based on the extracted one or more items includes:

comparing the geolocation associated with the data or the intermediate device with an expected geolocation for the data;

responsive to a determination that the geolocation associated with the data or the intermediate device and the expected geolocation for the data are within a threshold geographical distance, validating the activity of the intermediate device; and responsive to a determination that the geolocation associated with the data or the intermediate device and the expected geolocation for the data are outside a threshold geographical distance, refraining from validating the activity of the intermediate device.

15. The system of claim 14, wherein refraining from validating the activity of the intermediate device includes imposing a penalty on the intermediate device responsive to the geolocation associated with the data or the intermediate device and the expected geolocation for the data are outside a threshold geographical distance.

16. The system of claim 13, wherein the extracted one or more items includes a timestamp associated with the data, wherein validating the activity of the intermediate device based on the extracted one or more items includes:

identifying a plurality of timestamps associated with a plurality of timestamps associated with a set of data;

comparing the extracted timestamps with the timestamp associated with the data;

determining that the extracted timestamps with the timestamp associated with the data are within a similarity threshold; and validating the activity of the intermediate device based on the determination that determining that the extracted timestamps with the timestamp associated with the data are within the similarity threshold.

17. The system of claim 13, wherein creating and storing the record of the validated activity with the reference to the account that is associated with the intermediate device further comprises:

creating a summary of each activity in the record;

generating a hash of the summary; and storing the hash in a decentralized data storage system.

* * * * *